Nov. 4, 1969   R. L. FIFER   3,476,250
TRANSPORTABLE SEWAGE TREATING APPARATUS
Filed Dec. 5, 1967   2 Sheets-Sheet 1

INVENTOR.
ROLLAND L. FIFER
BY *Norman L. Wilson Jr.*
HIS ATTORNEY

Nov. 4, 1969   R. L. FIFER   3,476,250

TRANSPORTABLE SEWAGE TREATING APPARATUS

Filed Dec. 5, 1967   2 Sheets-Sheet 2

INVENTOR.
ROLLAND L. FIFER

BY *Norman L. Wilson Jr.*

HIS ATTORNEY

United States Patent Office 3,476,250
Patented Nov. 4, 1969

3,476,250
TRANSPORTABLE SEWAGE TREATING APPARATUS
Rolland L. Fifer, 6211 Glen Hill Road, Louisville, Ky. 40222
Filed Dec. 5, 1967, Ser. No. 688,237
Int. Cl. C02c 1/06
U.S. Cl. 210—199        6 Claims

ABSTRACT OF THE DISCLOSURE

A single aeration tank so elongated that its length and or width exceed its height and is adapted to function as a sewage treatment plant for installation in boats, buses, aircraft and other low confined spaces.

BACKGROUND OF THE INVENTION

The present invention relates to waste treatment plants of the activated sludge type. In a specific aspect the invention pertains to aerobic sewage treatment plants particularly suited for use in such confined spaces as on buses, boats, aircraft and boat docks.

In the activated sludge treatment of sewage the method of treatment involves the use of a tank in which sewage is mixed with previously activated sludge and subjected to the action of bacteria. This aerobic treatment is usually carried out in large tanks. Ordinarily the speed of movement of sewage through the tank is slow so that the sewage will remain in the tank a sufficient length of time to allow the bacteria to properly act upon the sewage. Since oxygen is necessary for bacterial action, air distributing means are employed, and these means are usually so arranged as to make it possible for the sewage to receive and absorb from the air as much oxygen as is necessary to support the bacterial action. In order to procure proper action it is also essential to keep the body of sewage in substantially constant movement to avoid any settling or separating out of heavier or more solid particles. Aerobic treatment tanks must, then, be so constructed as to perform the functions of circulation and mixing for a period of time sufficient to purify the material so that the effluent therefrom has a safe biological oxygen demand (B.O.D.).

Sewage aeration tanks are usually at least as high, and generally two to five times as high, as they are wide, with air being introduced at various points in the tank, usually near the bottom. In addition they are two to ten times as long as they are wide. These dimensions have been necessary in order that the air introduced will circulate sufficiently to keep a given amount of solid matter in suspension, and to prevent settling of solid portions. For these reasons it has not been possible to depart drastically from the minimum height to width to length ratios, length being its longer dimension, width its shorter. Thus, in the case of an aeration tank which is longer, or both longer and wider, than it is high, it is extremely difficult to introduce air throughout its length or width without quiescent zones. As a consequence, separation and settlement will result in sewage going septic, interfering with proper bacterial action, resulting in an effluent with a high B.O.D. content.

Since air must circulate with respect to the locus of its introduction in a turbulent flow pattern to effect maximum suspension, the production of waste treatment plants which are not as high as they are wide has not been feasible. As an example U.S. 2,616,848 pertains to a sewage treatment unit which is suitable for very small installations. However, it is noted that the height of aeration chambers 14 and 15 by far exceeds their lengths and widths. If required height and width dimensions are not met, other means of obtaining circulation must be utilized.

This is illustrated in U.S. 3,271,304 which shows another waste treatment unit of the aerobic type. In this installation deflector plates and venturi-type aspirators are employed in order to maximize circulation. Such devices have not been completely satisfactory. A unit of adequate capacity in which the effluent is of such low B.O.D. that it may safely be dumped into streams and water courses has not been provided for installation in boats, buses, planes and in other low, confined spaces where available dimensions are width and length with only limited usable height space. For this reason, the practice in such instances has been to use holding tanks to store sewage unitl it can be pumped into a treating plant.

SUMMARY OF THE INVENTION

In accordance with the practice of this invention a sewage treatment unit is provided which can be used where the height dimension must be shorter than its length dimension, and frequently shorter than both length and width. When operating batchwise, the average B.O.D. reduction using the treating apparatus of this invention is from 90 to 95 percent of the total B.O.D. present in the inflow. The sewage treatment apparatus contemplates a single aeration tank so elongated that its length, or both length and width exceed its height. In order to achieve a circulation pattern resulting in minimization of quiescent areas, the chamber is divided by the use of at least one substantially vertical impermeable baffle panel interposed between one pair of opposite tank walls. Each baffle panel forms a transverse partition connecting the other pair of walls, either the side walls or the end walls, between a point above the normal liquid level in the upper portion of the tank and the tank bottom. This arrangement results in a plurality of aeration chambers formed by the baffle panels, the number of baffle panels interposed being such that no aeration chamber operates with width to height ratio greater than one. In the aeration tank each baffle terminates above the tank bottom so that each aerating chamber communicates with an adjacent chamber. A single open zone of communication is thus formed beneath the baffles. In combination with the baffles air distributor means are employed in each aerating chamber so that the locus of the introduction of the air is along the entire length of the chamber relative to or parallel to the baffle panel so that air bubbles circulating therein create a circulation pattern throughout each circulating chamber. Since batchwise operation is contemplated, sufficient solids-bearing liquid must remain in the tank after liquid expulsion to support bacterial life. Accordingly liquid expulsion means are provided adapted to withdraw liquid after a settling period without agitating the retained portion.

DETAILED DESCRIPTION OF THE INVENTION

This invention can, perhaps, be better understood by reference to specific embodiments described in conjunction with the accompanying drawings.

FIGURE 2 is an isometric view showing completely a preferred treatment plant with flow lines, valves and the like.

Figure 1:
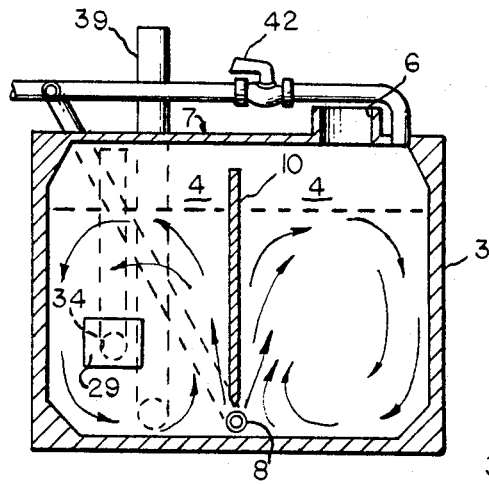
FIGURE 1 is a sectional view of one form of treatment plant, that is shown in FIGURE 2.
Figure 2:
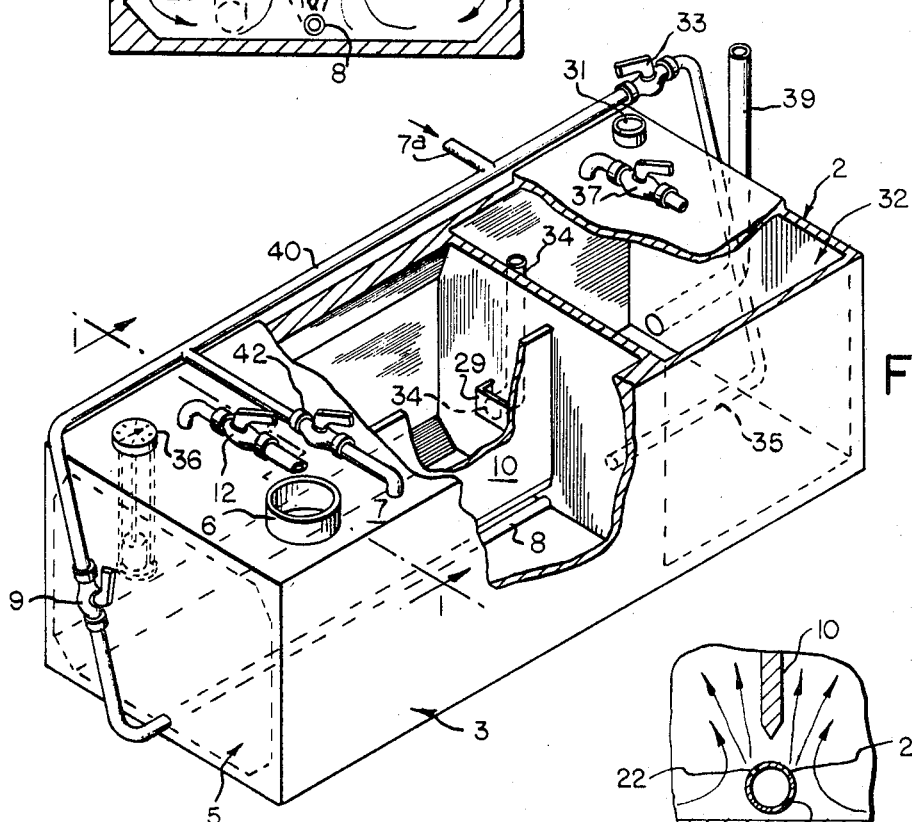

The invention herein is based, in part, on the discovery of means which make possible the maintenance of efficient air circulation in an elongated aeration tank. Such a tank 2 is shown in FIGURE 2 with sides 3, ends 5, a top 7, and a bottom adapted with fillets at their junctures as is known in the art. Desired air circulation is achieved by dividing the tank into a plurality of aeration chambers 4 in which sewage, entering tank 2 through influent pipe 6, will circulate in a plurality of streams with respect to the locus of the introduction of air at 8, as shown by the arrows in FIGURE 1. The division of the tank into intermediate aeration chambers is accomplished by the provision of one or more substantially vertical parallel baffle panels 10.

Considering the tank as having short end walls 5 and longer side walls 3, the baffle panel in FIGURE 2 extends between and connects the end walls. The baffle panel is spaced from side walls 3, and is substantially parallel thereto. Baffle panel 10 is secured to end walls 5 so that it extends above the level of the waste liquid at its upper end, and is directed downwardly toward the tank bottom, stopping short thereof as shown in FIGURE 1. Baffle panels are made of an impervious material such as plastic, metal and the like. The open upper portion of tank 2 above the baffles, but beneath top 7, permits excess air from the various chambers formed by the baffles to escape through valve 12 of a vent pipe. A zone of communication is also formed beneath the baffles. This zone or reservoir permits flow of waste liquors between the aeration chambers so as to equalize the B.O.D. in each chamber. The zone or reservoir beneath the baffles permits easier withdrawal of the treated sewage or effluent as will be described. Normally one-fifth of the depth of the solids-bearing liquid will be below the baffles, although up to one-half of the depth can be in the zone beneath the baffles. However, the B.O.D. reduction will not be as great since mixing efficiency is reduced when the baffle bottoms are raised.

It will be understood that the number of baffles interposed between the walls will depend on the distance between walls approximately parallel to the baffle panels. Whereas a greater number can be employed, the number of baffles generally will be such that no aeration zone is wider than it is high, its width being taken between the baffle and the opposite side wall or end wall, approximately parallel thereto. In other words the width to height ratio provided for the liquid in the chamber should not be greater than one in each aeration chamber, taking width as the distance between a baffle and an opposite side. Considering the aeration tank 2 itself as seen in FIGURE 2, its width, along ends 5, does not exceed its height. Its length, along sides 3, can exceed its height. However, in view of the manner in which air is introduced herein, this dimension is not detrimental. It is understood that baffle panels can be disposed parallel to either an end or a side wall so long as divisions into aeration chambers are proper.

Air employed in treatment systems of the type contemplated herein is essentially aerobic, with oxygen being supplied to the fluid waste material to provide for the necessary conversion. The action of air injected into the body of sewage not only aids in increasing the amount of oxygen absorbed by the sewage, but also creates turbulent flow patterns shown in the drawing, thereby maintaining proper suspension. In order to insure the desired flow pattern in each aeration chamber, as indicated by the arrows in the figures, an air distributor manifold 8 is employed. This provides a given amount of air so that finely divided solid matter will be effectively agglomerated.

Figure 3:
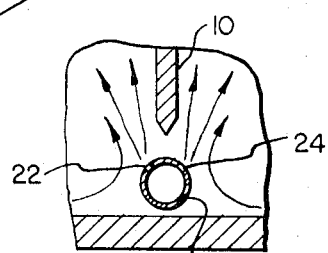
FIGURE 3 is a partial view of a preferred air distributor manifold.
Figure 7:
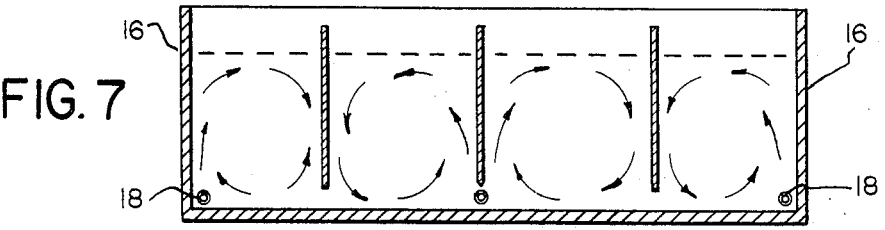
FIGURE 7 shows an alternate disposition of air distributor tubes in the tank of FIGURE 6.

To maintain a uniform circulation throughout aeration tank 2, and to prevent or minimize dead spots or quiescent zones, the air distributors are positioned near or at the bottom. As shown in FIGURE 7, distributor manifolds 18 can be placed along the base of the side walls 16. A particularly desirable air distributor pipe is an orifice tube 20, shown in FIGURE 3. As shown in FIGURE 3, this tube desirably is disposed only a few inches beneath a baffle panel 10, and it is provided with two sets of orifices 22 and 24, every other orifice being a member of one set, the alternate orifices being members of the other set. The orifices of one set are directed toward the aeration chamber on one side of the baffle panel, whereas the orifices of the other set are diverted toward the adjacent aeration chamber on the opposite side of the baffle panel as can be seen in FIGURE 1. Whether the diffuser tube is beneath the baffle panel or along the base of the wall, it is supplied with a sufficient number of orifices to release air bubbles across the entire length taken along the baffle of each aeration chamber so that substantially all of the liquid in the aerating chamber can be circulated. Since diffuser tubes are located lower than the baffle panels, they are in the lower half, preferably in the lower one-fifth of the liquid level. Air dispensers normally should be on, or within the first foot of, the bottom.

Figure 4:
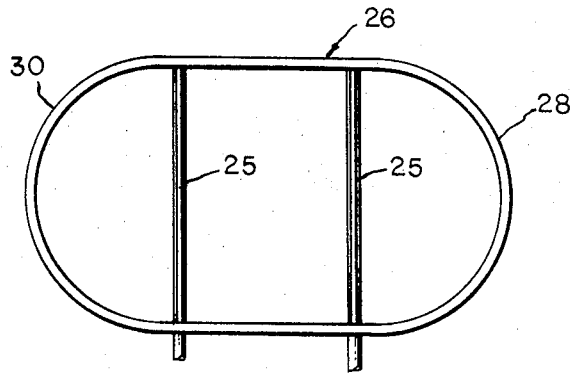
FIGURE 4 is a top plan view of a different form of aerating tank.

Whereas the aeration tank of this invention has been described as though it were rectangular in cross section, when viewed from above, it can be of any configuration. One such shape is illustrated in FIGURE 4, which shows an elongated tank 26 with arcuate ends 28 and 30. In this instance it will be more practical to employ diffuser tubes of the type which lie beneath baffles 25. Since there are only two baffles, one air diffusion tube will be provided with two sets of orifices directed to two of the aeration chambers as previously described. The other air diffusion tube will have only one set of orifices, diverted toward the third aeration chamber.

Referring now to FIGURE 2, there will be state or other government regulations requiring a chemical treatment of effluent to be released into lakes and waterways regardless of B.O.D. reduction. Accordingly a purification chamber 32 can be incorporated in the apparatus. An effluent withdrawal line 34 leads from the aeration tank to the purification chamber as shown. The mouth of the line is above the bottom of the tank for bacterial retention as described, and desirably a baffle plate 29 is placed in front of the withdrawal line inlet to minimize the flow of any suspended paritcles into the outlet.

The operation of the sewage treatment plant of this invention can best be described by reference to FIGURE 2, it being understood that influent lines, effluent outlet lines, air inlet lines and the like can be the same in the units shown in FIGURES 4, 5, 6, and 7. In large treatment plants it is important to establish a circulation which effects a settling of solid particles from the liquid sludge. In units which are the subject of this invention circulation is maximized for as much turbulence and as complete oxidation and bacterial action as possible. Thus, an influent conduit 6 can be placed to deliver sewage into either aeration chamber of tank 2 near the upper end of the aeration chamber. As a result of circulation achieved and the substantially open zone beneath the baffle the solids-bearing liquid becomes about equally distributed in all of the aeration chambers.

At the time sewage enters pipe 6 air is being brought into an air line 40 through air inlet 7a, and by valve 9 is diverted to air distributing tube 8 suitably placed, as described, for the purpose of releasing air bubbles across the length of the tank. Air vent valve 12 is opened during operation so that there will be no pressure buildup within the tank. Aeration tanks are generally designed on the basis of a twenty-four hour period of use, and those contemplated herein will normally have capacities of from 12 gallons to 1000 gallons. Normally for aeration tanks about 1000 or more cubic feet of air is injected per pound of B.O.D. In the apparatus herein 2400 to 2600 cubic feet of air per pound of B.O.D. will be introduced. As a guide, in most aeration units oxygen demand is about 2 p.p.m. and B.O.D. reduction is about 85 percent. These units are operated at an oxygen demand in the range of 2.2 to 3.5 parts per million with reductions greater than 90 percent.

Outlet conduit 34 is provided for the withdrawal of effluent from the tank after it has been allowed to settle. The conduit is so placed that solids-bearing liquid remains in the tank for bacterial retention. It is generally more efficient to position the effluent conduit so that one-fourth of the solids-bearing liquid remains in the tank. The effluent outlet can be so positioned so that even as much as one-third remains. The capacity of the unit is, of course, reduced when less than three-fourths of the effluent is withdrawn.

With this apparatus by the time the unit has filled to capacity the sewage will have been virtually purified. Although not necessary, it is preferred to employ a liquid level gauge 36 to inform the user that the tank is full. If desired, it can be operated for a short period after it is full to insure purification. Then if the treatment plant is not provided with a purification chamber 32 and is not disposed where pressure is opposed to effluent flow, e.g. below a water level, for instance where it is in a boat, the effluent conduit can be adapted for gravity flow. If pressure is needed, for instance to force the effluent into a lake, the liquid expulsion means shown in FIGURE 2 is desired. If pumps are employed to force the treated liquid into effluent outlet line 34 provisions such as pump cover plates and the like must be made to prevent the retained solids-bearing liquid from being agitated, particularly if no purification chamber is used. The withdrawal means illustrated in FIGURE 2 overcomes these problems. The unit is adapted so that the air normally supplied to the aeration chamber can be diverted to the top of the aeration chambers. This is accomplished by valve 42 in air line 40. Air valve 9 and air vent valve 12 are closed shutting off the normal air circulation through the unit. After a settling period of fifteen minutes to one-half hour valve 42 is opened. The air supply is again activated, and air passing through tube 40 and valve 42 enters the zone above the baffles. As the quantity increases its pressure lowers the liquid level by forcing effluent through its outlet 34 into a purification chamber 32 or to some other point of discharge.

To operate purification chamber 32 a chemical purifier such as a chlorine compound is introduced through inlet 31. In addition valve 33 is opened so that air, serving as a mixing means, is introduced through openings or perforations in conduit 35. To empty this chamber valve 37 is closed with air still being admitted through tube 35. The air fills the space above the liquid in the chamber and then forces the purified effluent through effluent outlet 39. Here again gravity flow can be used where possible.

To further illustrate the invention reference is made to the following example.

A sewage disposal plant similar to that shown in FIGURE 2 was made having a 12 gallon capacity in 24 hours, and adapted with a 7 cubic feet per minute blower. The unit was charged with 10 quarts aerated sludge, 5 quarts return sludge, 10 quarts raw sewage, 5 quarts tap water, 30 quarts total or 7½ gallons in system, feeding 7 c.f.m. of air. Between four and five hours later one gallon of effluent was drawn off for testing. The results are as follows: oxygen demand 2.7 p.p.m.; pH 7.6; and settable solids (30 minutes) 15 percent. After testing 3½ gallons of raw sewage were added to the system bringing it to 9 gallons. An hour later a half gallon of raw sewage was added; and after a further hour's elapse an additional half gallon of raw sewage was introduced. The unit was operated for one hour and then turned off for 30 minutes. The effluent was clear and flaky indicating more air than necessary. Two more gallons of raw sewage were delivered to the system bringing it to 10 gallons. The blower was begun and the unit operated overnight at 6 c.f.m. The next morning tests were again taken on the system. The oxygen demand was 3.1 p.p.m. and the pH was again 7.6. The B.O.D. reduction was 91.4%. The system performed exceptionally well even with 17 gallons of raw sewage added over a 24 hour period and a purification chamber such as 32 was not needed.

Figure 5:
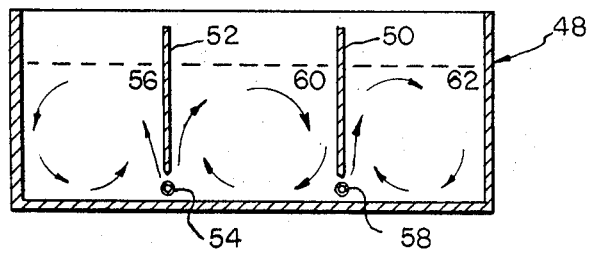
FIGURE 5 is a longitudinal sectional view of another form of treatment plant of this invention.
Figure 6:
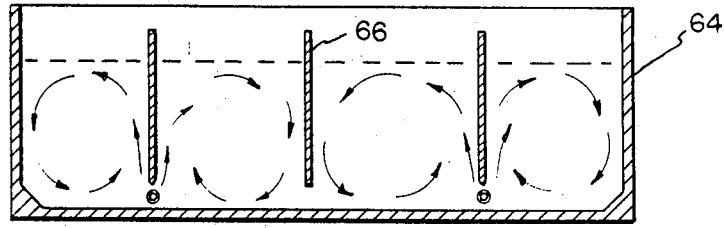
FIGURE 6 is a longitudinal sectional view of still another form of treatment plant.

Since baffles extend along the entire distance across a purification tank, their number is determined by the opposite dimension, which can be called the width of the tank, as illustrated in FIGURES 5, 6, and 7. It is understood, of course, that more baffles than those to form chambers whose heights equal their widths can be used. In such instances heights will exceed the widths of aeration chambers. The type of air distributor manifold will depend upon the chambers formed by the baffles. Thus in aeration tank such as 48 of FIGURE 5, since only two baffle panels 50 and 52 are used, three chambers are formed. Air distributor tube 54 will, therefore, have one set of orifices directed into chamber 56 whereas air distributor manifold 58 will have two sets of perforations, as described in connection with FIGURE 3, directed into chambers 60 and 62. It is preferred to divide the aeration tank into an even number of chambers so that the air distributing means of FIGURE 3 can be used in all instances. A four chamber treatment tank 64 is shown in FIGURE 6. In this apparatus it is unnecessary to have an air distributor beneath baffle panel 66. In addition instead of two air distributing manifolds, three distributors can be employed as in FIGURE 7. Thus, it is obvious that various modifications of the apparatus are possible. Air can be obtained from any source, such as an air blower placed in any position relative to the unit. The purification tank also need not be beside the unit. It can be behind it and can be either integral with the unit or separated therefrom. In addition various chemicals can be employed in the purification as is well-known. Thus such chlorine compounds as calcium hypochlorite, will be used. Further any of the known metals such as steel, brass and plastics such as fiber glass and polypropylene can be used in the manufacture of the aeration tank and its flow conduits. These and other variations will occur to one skilled in the art. Such ramifications are deemed to be within the scope of this invention.

What is claimed is:

1. A sewage treatment apparatus of the activated sludge type including an aeration tank with air diffuser means positioned therein to release gas bubbles to break up and maintain the solids of the sewage in suspension and to provide oxygen for aerobic biological action, said apparatus adapted for batchwise purification where low, wide units are needed which comprises an aeration tank so elongated that at least its longer dimension exceeds its height, a single vertical impermeable baffle panel interposed between one pair of opposite tank walls, said baffle panel forming a transverse partition between the other pair of walls between a point above the normal liquid level in the upper portion of the tank and the tank bottom, dividing the tank into two aeration chambers, the panel being disposed between and connecting the two walls which are farthest apart, the baffle panel terminating above the tank bottom so that the aerating chambers are in communication at their lower ends, a single open zone of communication being formed beneath the baffle, an air distributor manifold disposed along one side of each aeration chamber and extending completely across the aeration chamber parallel to the baffle panel, the manifold being provided with air openings within each chamber along its entire length, creating, when liquid is in the tank, a circulation pattern in each aeration chamber with respect to the locus of the introduction of air so that substantially all of the liquid within the tank can be circulated, an influent inlet communicating with an aeration chamber, and an effluent outlet having its opening in one of the chambers above the single open zone of communication so that liquid below its opening in said zone remains in the tank for bacterial retention after liquid is removed from the aeration chambers through the effluent outlet.

2. The apparatus of claim 1 wherein an air diffuser manifold is located directly beneath the baffle, said air diffuser manifold having alternately directed perforations, one set adapted to dispense air into one chamber, and one set into the other chamber.

3. The apparatus of claim 2 including a first valve means shutting off air supplied to the diffuser manifold, and a second valve means for forcing air into the upper portion of the tank above the liquid in the aeration chambers to drive said liquid into the effluent outlet by virtue of the air pressure on the surface thereof without disturbing the zone of communication beneath the baffle panel.

4. In the apparatus of claim 2, a purification chamber located near said aeration tank, an outlet in said chamber, means for discharging into said purification chamber liquid withdrawn from the aeration chambers through the effluent outlet, and means for forcing air into the upper portion of the purification chamber above the liquid level therein to drive said liquid through the outlet in said chamber.

5. A sewage treatment apparatus of the activated sludge type including an aeration tank with air diffuser means positioned therein to release gas bubbles to break up and maintain the solids of the sewage in suspension and to provide oxygen for aerobic biological action, said apparatus adapted for batchwise purification where low, wide units are needed which comprises an aeration tank so elongated that at least its longer dimension exceeds its height, a plurality of vertical impermeable baffle panels interposed between one pair of opposite tank walls, each baffle panel forming a transverse partition connecting the other pair of walls between a point above the normal liquid level in the upper portion of the tank and the tank bottom, dividing the tank into a plurality of aeration chambers, the number of baffle panels interposed being such that no aeration chamber has a width to height ratio greater than one, width being the distance between a baffle panel and the opposite wall, all baffle panels terminating above the tank bottom so that each aerating chamber communicates at its lower end with an adjacent chamber forming a single open zone of communication beneath the baffles, an air distributor manifold disposed along one side of each aeration chamber and extending completely across the aeration chamber parallel to the baffle panel, the manifold being provided with air openings within each chamber along its entire length, creating, when liquid is in the tank, a circulation pattern in each aeration chamber with respect to the locus of the introduction of air so that substantially all of the liquid within the tank can be circulated, an influent inlet communicating with an aeration chamber, and an effluent outlet having its opening in one of the chambers above the single open zone of communication so that liquid below its opening in said zone remains in the tank for bacterial retention after liquid is removed from the aeration chambers through the effluent outlet.

6. The apparatus of claim 5 wherein two baffle panels are interposed between opposite walls forming four aerating chambers, and wherein the air diffuser means for the four aeration chambers includes an air distributor tube located directly beneath each baffle, each air distributor tube having alternately directed perforations, one set adapted to dispense air into one chamber, and one set into the other chamber.

References Cited
UNITED STATES PATENTS 2,212,841   8/1940   Maxwell _____ 210—220 X

FOREIGN PATENTS 90,860   5/1959   Netherlands.
1,080,034   4/1960   Germany.

JAMES L. DECESARE, Primary Examiner

U.S. Cl. X.R.

210—220